Figure 6:
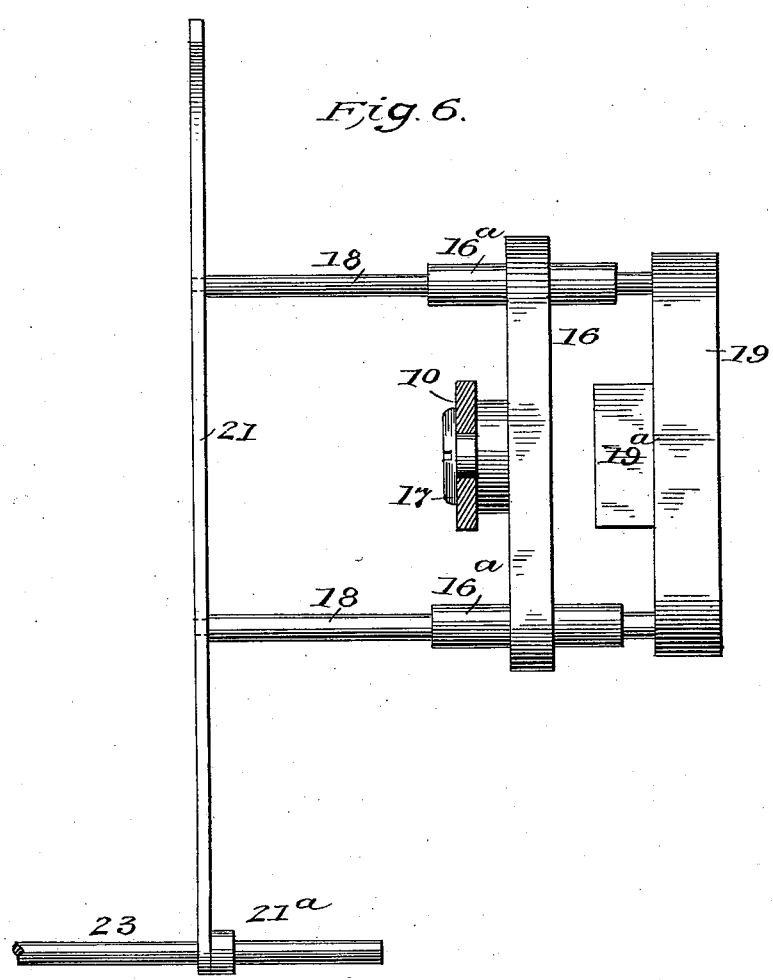

(No Model.) 2 Sheets—Sheet 1.
O. R. KUNER.
BELT SHIFTING DEVICE.
No. 546,618. Patented Sept. 17, 1895.
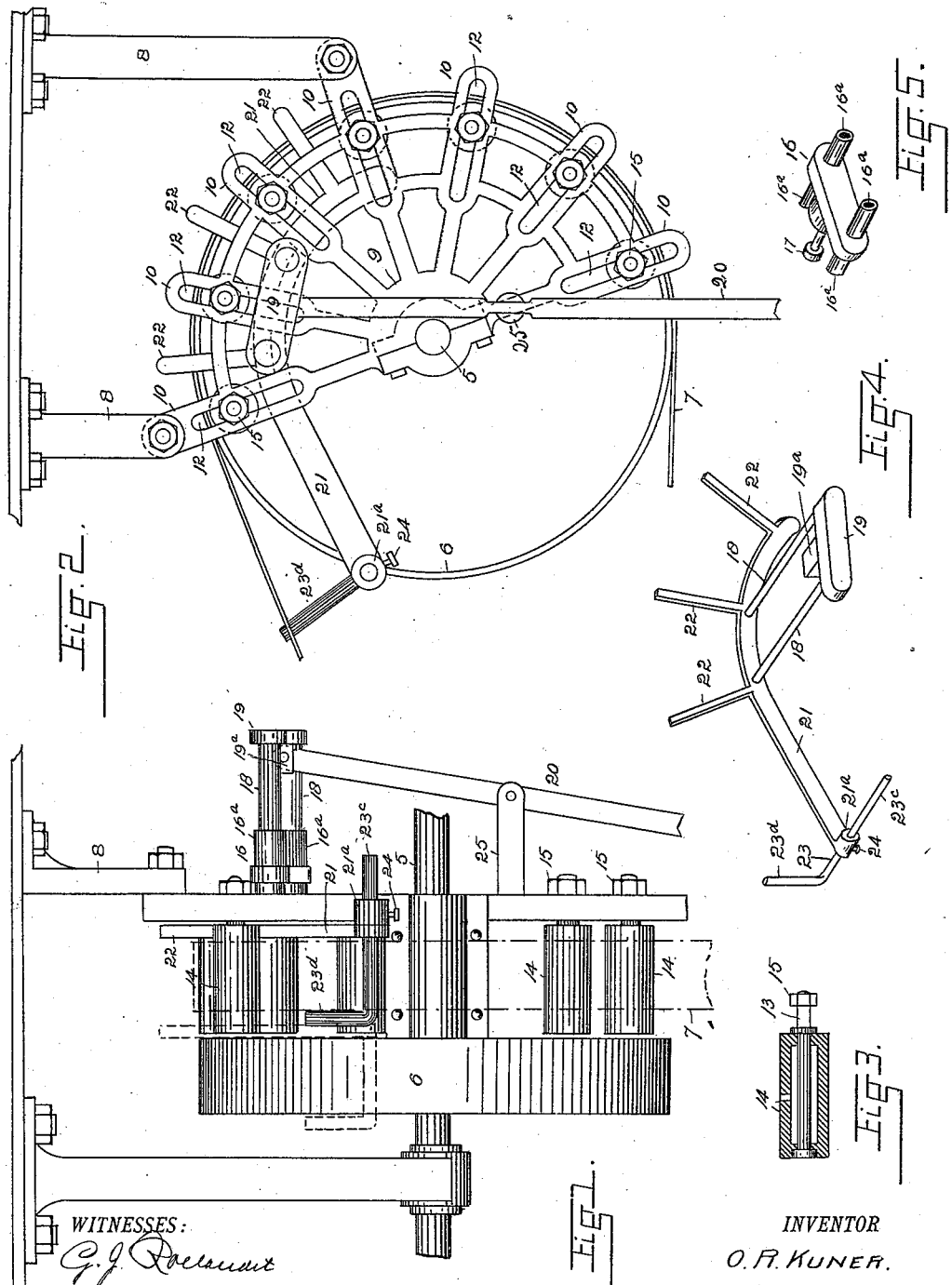
WITNESSES:
G. J. Roelant
Chas. E. Dawson
INVENTOR
O. R. Kuner.
BY
A. J. O'Brien
ATTORNEY (No Model.)   2 Sheets—Sheet 2.

O. R. KUNER.
BELT SHIFTING DEVICE.

No. 546,618.   Patented Sept. 17, 1895.

Witnesses
Chas. E. Dawson
G. J. Ollaudet

Inventor.
O. R. Kuner
By A. J. O'Brien,
Atty

UNITED STATES PATENT OFFICE.

OSCAR ROBERT KUNER, OF EBERSBACH, GERMANY.

BELT-SHIFTING DEVICE.

SPECIFICATION forming part of Letters Patent No. 546,618, dated September 17, 1895.

Application filed May 25, 1894. Serial No. 512,418. (No model.) Patented in Belgium January 30, 1893, No. 103,200; in France February 7, 1893, No. 227,715; in England February 27, 1893, No. 4,272, and December 30, 1893; in Austria-Hungary June 22, 1893, No. 2,137 and No. 1,974, and in Germany July 27, 1893, No. 16,324.

*To all whom it may concern:*

Be it known that I, OSCAR ROBERT KUNER, a citizen of Germany, residing at Ebersbach, Kingdom of Saxony, Germany, have invented certain new and useful Improvements in Belt-Shifting Devices, (patented in France February 7, 1893, No. 227,715; in Belgium January 30, 1893, No. 103,200; in England February 27, 1893, No. 4,272, and December 30, 1893; in Germany July 27, 1893, No. 16,324, and in Austria-Hungary June 22, 1893, No. 2,137 and No. 1,974;) and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in belt-shifting devices, and has for its special object the ready shifting of the line-shaft belt from the pulley on the line or main shaft and the supporting of the shifted belt in suitable proximity to said pulley, whereby the belt ceases to run when shifted, but may be quickly replaced whenever it is necessary to start the machine.

Heretofore the custom has been to have the pulley on the line-shaft twice the width of the belt and to have a loose pulley on the shaft of the machine to be operated. When it is desired to stop the machine, the belt is shifted from the fast pulley on the shaft of the machine to the loose pulley, but the belt continues to run, since it still engages the wide pulley on the line-shaft. My improved device is stationary, but is located on the line-shaft, which moves freely therein. In this case the pulley on the line-shaft is only of a width necessary to support the belt when the machine is in operation and the loose pulley on the shaft of the machine is dispensed with. When it is desired to stop the machine, the belt is shifted from the pulley on the line-shaft to my stationary supporting device. Hence as soon as the belt is shifted it stops and no loose pulley is needed on the shaft of the machine, since the belt may remain on the fast pulley. To start the machine, it is only necessary to shift the belt from my supporting device on the line-shaft to the adjacent fast pulley.

The device will be fully understood by reference to the accompanying drawings, in which is illustrated an embodiment thereof.

In the drawings, Figure 1 is a front view of the device supported in position for use. Fig. 2 is a side view of the same. Fig. 3 is a sectional detail illustrating one of the supporting-rollers. Fig. 4 is a detail view in perspective of the shifting device proper. Fig. 5 is a similar view of the holder for the said device. Fig. 6 is a top view of the belt-shifting mechanism illustrated in connection with one of the radial arms 10, which is shown in cross-section.

Similar reference characters indicating corresponding parts or elements in these views, let the numeral 5 designate the line-shaft of a power plant, 6 a pulley on said shaft, and 7 the belt connecting said pulley with the pulley on the shaft of a machine. (Not shown.)

Supported by means of hangers 8 is the stationary segmental frame, forming the framework of the device and composed of the hub 9 and the radial arms 10. The line-shaft 5 passes through the hub of the device and rotates freely therein. The arms 10 are provided with longitudinal slots 12, in which are inserted the spindles 13, carrying the rollers 14. The spindles are made fast to the arms by the adjusting-nuts 15. By loosening these nuts the spindles and rollers may be adjusted to correspond with the size of the pulley 6. The slots 12 may be of sufficient length to permit any desired range of adjustment.

Attached to one of the arms 10 is the holder 16, which is fastened to the arm by means of a screw 17, passing through the slot of the arm. This holder consists of a short bar, apertured at its extremities to receive the arms 18 of the shifting device. The holder is provided with sleeve extremities 16$^a$, surrounding the apertures and forming a bearing for the sliding arms 18 of the shifting device. These sliding arms are connected by a cross-head 19, attached to the arms at one extremity. This cross-head has a central lug 19ª, to which the upper extremity of the shifting-lever 20 is movably attached. This cross-head of the shifting device is located to the right of the segmental frame, referring to Fig. 1.

The arms 18 straddle the radial arm, to which the holder is attached; and their extremities opposite the cross-head are made fast to a curved bar 21, provided with upwardly-projecting belt-replacing arms 22. To the outer extremity of the bar 21 is adjustably attached the belt-removing arm 23. The horizontal part 23ᶜ of the last-named arm passes through a sleeve 21ª, formed on the bar 21, and is adjustable by means of a set-screw 24.

The arm 23 has an upwardly-projecting part 23ᵈ, adapted to engage the edge of the belt farther to the left in Fig. 1. The horizontal part 23ᶜ of this arm should be so adjusted that the arm 23ᵈ and the arms 22 will occupy planes separated by a space somewhat greater in width than the width of the belt, so that the removing and replacing arms may be located on opposite sides of the belt, and at the same time avoid friction when the belt is moving.

The lever 20 is fulcrumed on a projection 25, made fast to the segmental frame, and extends downward within reach of the person in charge of the machine. When it is desired to stop the machine, this lever is moved to the position shown in Fig. 1. During this movement, the arm 23ᵈ engages the edge of the belt 7 and shifts the belt from the pulley 6 to the rollers 14 of the segmental frame, and the belt ceases to move. When it is desired to replace the belt, the position of the lever is reversed. During this reversing movement, the arms 22 of the shifting device engage the opposite edge of the belt, or that shown to the right in Fig. 1, and move the belt from the rollers 14 to the pulley.

It will thus be seen that by the use of my improved device all belts are stopped except those employed in connection with the machines in immediate operation. Hence there is not only a saving in power, but all unnecessary wear upon the belts is obviated and an important element of safety is introduced, since all unnecessary moving of belts is dispensed with.

Having thus described my invention, what I claim is—

1. In a belt-shifting and supporting device, the combination of the stationary segmental frame having the slotted arms, the supporting rollers having spindles adjustably attached to the arms, and suitable means attached to the supporting frame for removing and replacing the belt, substantially as described.

2. The belt-shifting device composed of the cross-head, the curved bar, the arms 18 connecting said parts, the replacing arms attached to the bar, and the adjustable removing arm also attached to the bar, substantially as described.

3. In a belt shifting and supporting device, the combination of the segmental frame, supporting rollers attached to the frame, the shifting device composed of the cross-head, the bar, and the arms connecting the cross head and bar; the removing and replacing arms attached to the bar, and the lever suitably connected with the shifting device, substantially as described.

In testimony whereof I affix my signature in the presence of two witnesses.

OSCAR ROBERT KUNER.

Witnesses:
VESPASIAN SLEWIG,
WILHELM HERMANN.